(No Model.)

E. H. SMITH.
APPARATUS FOR REMOVING STAR FISH FROM OYSTER BEDS.

No. 379,422.  Patented Mar. 13, 1888.

UNITED STATES PATENT OFFICE.

ELWOOD H. SMITH, OF NEW HAVEN, CONNECTICUT, ASSIGNOR TO J. SMITH & SONS, OF SAME PLACE.

APPARATUS FOR REMOVING STAR-FISH FROM OYSTER-BEDS.

SPECIFICATION forming part of Letters Patent No. 379,422, dated March 13, 1888.

Application filed January 3, 1888. Serial No. 259,649. (No model.)

*To all whom it may concern:*

Be it known that I, ELWOOD H. SMITH, of New Haven, in the county of New Haven and State of Connecticut, have invented a new Improvement in Apparatus for Removing Star-Fish from Oyster-Beds; and I do hereby declare the following, when taken in connection with accompanying drawings and the letters of reference marked thereon, to be a full, clear, and exact description of the same, and which said drawings constitute part of this specification, and represent, in—

Figure 1:
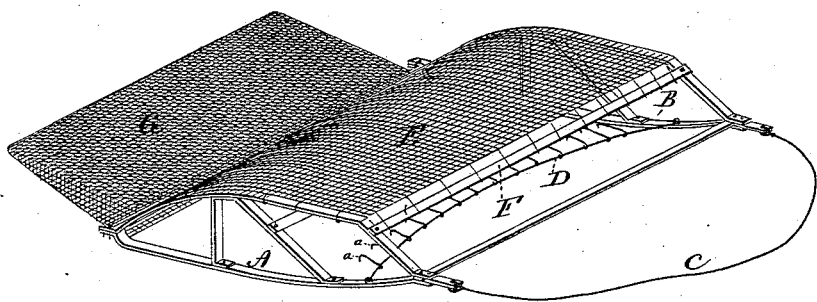
Figure 2:
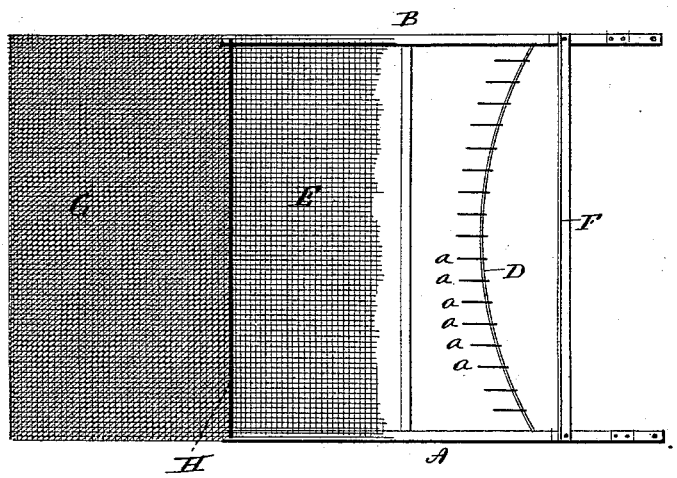
Figure 3:

Figure 1, a perspective view of the apparatus complete; Fig. 2, a top or plan view, portion of the net broken away; Fig. 3, a detached view showing the line D and one of the drags enlarged.

This invention relates to an apparatus for detaching and removing star-fish from oyster-beds.

Numerous devices have been employed to drag over oyster-beds, having for their object to remove star-fish; but one serious difficulty is encountered in the apparatus as heretofore constructed. The drag over the oyster-bed has been of a hard or unyielding character, and unavoidably detaches many oysters or disturbs the bed to a very great extent, and in many cases the rigidity of the fish detaching and catching mechanism on mud or soft bottoms disturbs the bottom so as to force the oysters into the mud, or raise the mud to such an extent that it will settle onto the oysters and destroy them.

The object of my invention is to provide an apparatus which will detach and catch the fish without materially disturbing the oysters or surface upon which the oysters rest; and it consists in a pair of connected runners distant from each other, the said runners having combined therewith a flexible line extending from one runner to the other, armed with drags, so that as the apparatus is drawn over the beds the flexible line will adapt itself to the shape of the bed, and the drags attached thereto will act upon the star-fish so as to detach them from the oysters, and also in combining therewith a net in rear of said drag-line, the mouth of the net presenting a flexible edge downward, to also follow upon the surface of the oyster-bed, and so as to yield to the irregularities of the bed without disturbing the oysters, as more fully hereinafter described.

A represents one runner, and B the other. These two runners are preferably made from metal of an open frame-like character, and as light as may be consistent with the requisite strength, but so as to support the apparatus. The runners are connected by suitable rods to support the runners. At the forward end a suitable connection, C, is made, by which the apparatus may be drawn over the bed. Near the forward end is a flexible line, D, attached to the two runners, but of a length somewhat greater than the distance between the runners, so as to leave the line free and flexible between the runners, that it may adapt itself to the shape of the bed and easily yield in passing over the irregularities. This line is provided with numerous drags *a*. These are best made in the form of hooks, the point of the hook downward. They are hung free to the line, as represented in Fig. 3, and as many of these hooks are applied to the line as may be desirable; but the number should be sufficient, so that practically no fish will escape between the drags.

As the apparatus is drawn over the bed, it is supported solely upon the runners at a considerable distance apart, so that there is no disturbance of the oysters by the frame between the runners, and the disturbance by the runners themselves will be extremely slight, nor is there anything between the runners to disturb the ground upon which the oysters lie, so that if soft it will not raise the mud.

As the apparatus is drawn over the bed, the line D will run in nearly close contact therewith, but owing to its flexibility will pass easily over the oysters, so as not to disturb them to any considerable extent; but the drags *a* will attack the star-fish, so as to force them to disengage their connection with the oysters, and upon such disengagement they naturally rise to some extent above the oysters. To catch the star-fish thus detached or raised from the bed, a net, E, is provided, which is attached at its forward end near the front of the frame, say, to a cross-bar, F. This net extends to the rear of the runners, where it is made into a bag-like form, G. The under edge of the net or bag-like portion G is secured to the runners by a flexible line, H, which extends from one runner to the other, and to which the lower edge of the mouth of the net is made fast. This connection H between the runners is of a length somewhat greater than the distance between the runners, so as to leave a very considerable degree of flexibility to the connection, and as the apparatus is drawn over the bed this line will follow substantially upon the oysters, but yield to the irregularities or obstructions, such as the oysters themselves would naturally offer, but is sufficient to hold the lower edge of the mouth down while the net above floats and leaves the mouth open, and so that the star-fish, floating, will be caught in the bag G as the apparatus progresses over the bed.

Under this construction of apparatus the difficulties which have hitherto existed in the apparatus for removing star-fish are practically overcome, and the star-fish are surely detached and gathered without fear of disturbing or in any way injuring the oysters.

I claim—

1. In an apparatus for removing star-fish from oyster-beds, the combination of the two runners A B, distant from each other, with connections to form a frame-work for the support of the runners, and a flexible line, D, extending from one runner to the other, but of greater length than the distance between the runners, the said line provided with numerous drags $a$, substantially as and for the purpose described.

2. The combination of the two runners A B, distant from each other and forming the supports for the apparatus, a flexible line, D, between said two runners, of a length greater than the distance between the runners, and provided with drags $a$, a net, E, attached by its forward end to the frame-work and extending to the rear in the form of a bag, G, and a flexible line, H, extending between the runners, the lower side of the mouth of the said bag G attached to said line H, substantially as and for the purpose described.

ELWOOD H. SMITH.

Witnesses:
FRED C. EARLE,
J. N. SHUMWAY.